(12) United States Patent
Choi (10) Patent No.: US 7,821,752 B2
(45) Date of Patent: *Oct. 26, 2010

(54) DEVICE TO PROTECT A SEMICONDUCTOR DEVICE FROM ELECTROSTATIC DISCHARGE BY EFFICIENTLY DISCHARGING A MICRO CURRENT

(75) Inventor: Nak Heon Choi, Gyeonggi-do (KR)

(73) Assignee: Hynix Semiconductor Inc., Kyoungki-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 12/031,132

(22) Filed: Feb. 14, 2008

(65) Prior Publication Data

US 2008/0198518 A1    Aug. 21, 2008

(30) Foreign Application Priority Data

Feb. 15, 2007    (KR) .................. 10-2007-0016259

(51) Int. Cl.
*H02H 9/00*    (2006.01)
(52) U.S. Cl. ........................................ 361/56
(58) Field of Classification Search .............. 361/56
See application file for complete search history.

(56) References Cited

U.S. PATENT DOCUMENTS 5,917,689 A * 6/1999 English et al. ............... 361/56
6,388,850 B1 * 5/2002 Ker et al. ..................... 361/56
6,624,992 B1 * 9/2003 Aparin ......................... 361/56
7,430,099 B2 * 9/2008 Kwak et al. .................. 361/56
2007/0195472 A1 * 8/2007 Kwak et al. .................. 361/56
2008/0158749 A1 * 7/2008 Kwak et al. .................. 361/56

FOREIGN PATENT DOCUMENTS

| KR | 19930008886 B1 | 9/1993 |
| KR | 20040059461 A | 7/2004 |
| KR | 20050079537 A | 8/2005 |
| KR | 10-0587089 B1 | 5/2006 |
| KR | 10-0701708 B1 | 3/2007 |

* cited by examiner

*Primary Examiner*—Ronald W Leja
(74) *Attorney, Agent, or Firm*—Ladas & Parry LLP (57) ABSTRACT

A device to protect a semiconductor device from electrostatic discharge is disclosed. In order to protect an internal circuit from electrostatic discharge, the semiconductor electrostatic protection device includes a transfer unit for transferring static electricity inputted to an input/output terminal to a first power line. A driving unit is also included for outputting a driving voltage corresponding to a potential difference between the input/output terminal and the first power line. Finally, a discharge unit for discharging the static electricity inputted to the input/output terminal to a second power line by way of the driving voltage is provided. The semiconductor electrostatic protection device prevents damage to an internal circuit due to the voltage drop of an intermediate medium by reducing the intermediate medium on a static electricity discharge path.

8 Claims, 8 Drawing Sheets

DEVICE TO PROTECT A SEMICONDUCTOR DEVICE FROM ELECTROSTATIC DISCHARGE BY EFFICIENTLY DISCHARGING A MICRO CURRENT

CROSS-REFERENCE TO RELATED APPLICATIONS

The present application claims priority to Korean patent application number 10-2007-0016259 filed on Feb. 15, 2007, which is incorporated herein by reference in its entirety.

BACKGROUND OF THE INVENTION

The present invention relates generally to a semiconductor device, and more particularly to a device that protects an internal circuit of a semiconductor device from damage resulting from electrostatic discharge (ESD).

Generally, an electrostatic discharge phenomenon is sorted according to the cause of the electrostatic generation. In other words, they are sorted as a human body model (HBM) where static electricity is generated by means of a human body, a machine model (MM) where static electricity is generated by means of contact with some sort of measuring equipment, and a charge device model (CDM) where static electricity accumulated in an element makes external contact to instantly generate static electricity.

Such static electricity flows intensively through any weak portions of a semiconductor device to melt junction or contact parts of an internal element or a gate oxide film, etc. causing failure of a semiconductor device. In particular, as manufacturing techniques for semiconductor devices develops, a thickness of a gate insulating film of a transistor that constitutes an input/output buffer has become thinner so that a voltage capable of destroying a gate insulating film is lowered.

Therefore, studies are being performed to lower an operating voltage of a device in order to protect a semiconductor device from electrostatic discharge.

Figure 1:
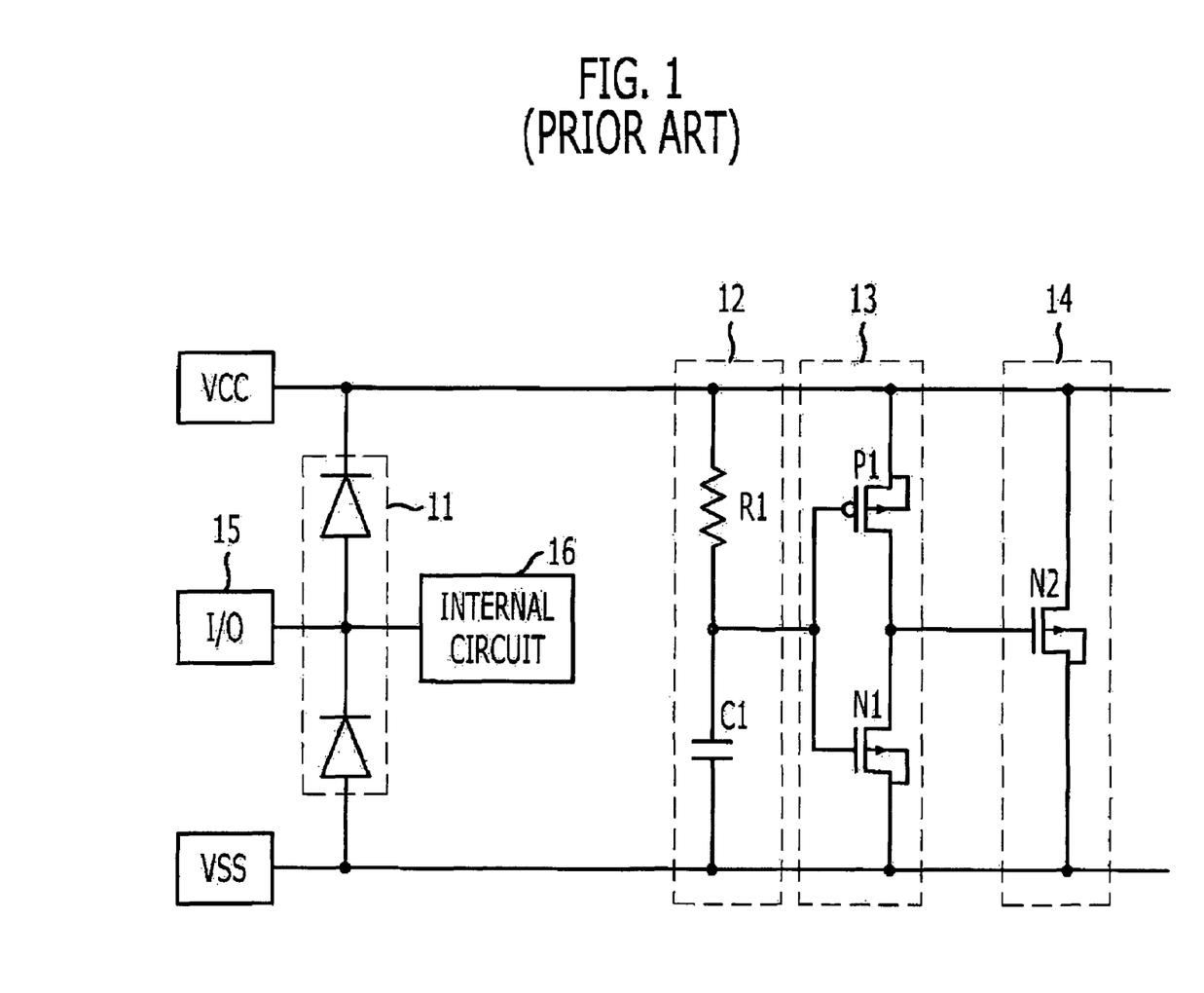
FIG. 1 is a circuit view of a device to protect a semiconductor device from electrostatic discharge according to the conventional art.

FIG. 1 is one example of a device to protect a semiconductor device from electrostatic discharge according to the prior art. An example of an operation of electrostatic discharge, static electricity inputted through an input/output terminal 15 is discharged and transferred to a power voltage line VCC through a transfer means 11 configured of diodes. The static electricity that is transferred to the power voltage line VCC is detected by a detection means 12 configured of a resistance element R1 and a capacitor C1 coupled in series between the power voltage line VCC and a ground voltage line VSS. The detected voltage is amplified by a driving means 13 to operate a discharge means 14. Therefore, the power voltage line VCC and the ground voltage line VSS are intercoupled so that the static electricity input to the power voltage line VCC is discharged to the ground voltage line VSS.

The protection device of FIG. 1 as described above detects a voltage drop in the detection means 12 corresponding to an alternating current in the early stage of electrostatic generation to drive the discharge means 14 in order to increase an operation speed of the electrostatic discharge protection device of the semiconductor device. However, since the voltage drop detected by the detection means 12 is limited to a rising interval of the static electricity, it is difficult to detect the voltage drop from other intervals of electrostatic generation, e.g., a peak interval or a falling interval of the static electricity that may result in internal circuit 16 being damaged.

Devices have been disclosed to protect a semiconductor device from electrostatic discharge utilizing a detection means including a resistor and diode to account for such problems as mentioned above. However, the detection means detect a voltage drop when the operating voltage of the diode is applied, but an operation when the electrostatic current becomes smaller than the operating voltage of the diode is not sufficient to prevent damage to an internal circuit.

SUMMARY OF THE INVENTION

The present invention provides a device to protect a semiconductor device from electrostatic discharge to protect an internal circuit from damage by sufficiently discharging a micro current in a latter half part of static electricity inputted to the semiconductor device.

The present invention also provides a device to protect a semiconductor device from electrostatic discharge preventing the damage on a gate insulating film or a junction part of an internal element due to the voltage drop generated from an intermediate medium by reducing the intermediate medium on a discharge path.

In order to accomplish the above, an embodiment of the present invention provides a device to protect a semiconductor device from electrostatic discharge including: a transfer unit transferring static electricity input to an input/output terminal to a first power line; a driving unit outputting a driving voltage corresponding to a potential difference between the input/output terminal and the first power line; and a discharge unit discharging the static electricity input to the input/output terminal by way of the driving voltage to a second power line.

When the first power line is a power voltage line and the second power line is a ground voltage line, the transfer means is constituted by including a forward diode, and the driving unit includes a PMOS transistor and a resistor coupled in series between the input/output terminal and the second power line, wherein preferably, a source of the PMOS transistor is coupled to the input/output terminal, a drain thereof is coupled to one terminal of the resistor, and a gate thereof is coupled to the first power line. And, the discharge unit preferably has a transistor switched by way of the driving voltage.

Alternatively, when the first power line is a ground power line and the second power line is a power voltage line, the transfer unit is constituted by including a forward diode, and the driving unit includes a NMOS transistor and a resistor coupled in series between the input/output terminal and the second power line, wherein, preferably, a source of the NMOS transistor is coupled to the input/output terminal, a drain thereof is coupled to one terminal of the resistor, and a gate thereof is coupled to the first power line. And, the discharge unit preferably has a transistor switched by way of the driving voltage.

DESCRIPTION OF SPECIFIC EMBODIMENTS

Hereinafter, preferred embodiments of the present invention will be described in detail with reference to the accompanying drawings.

Figure 2:
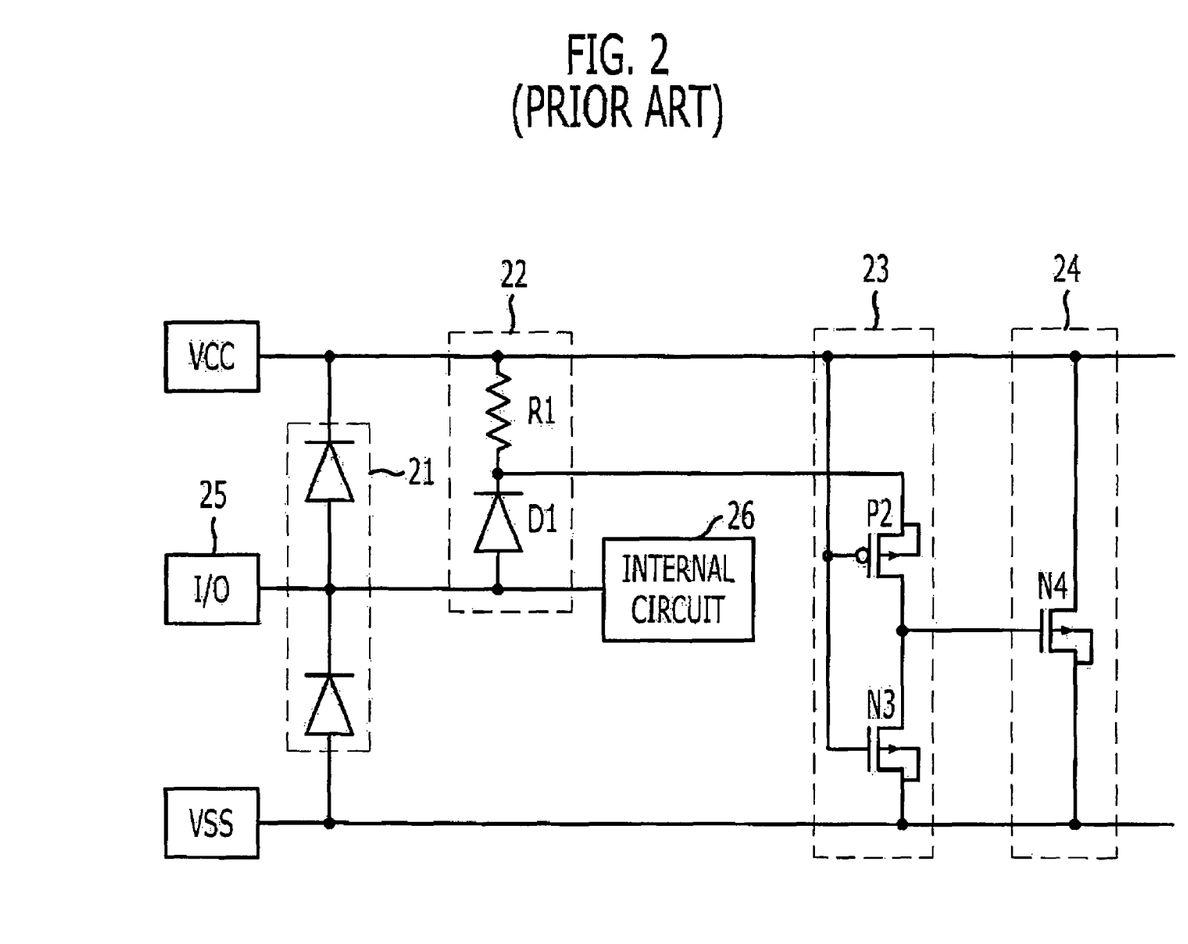
FIG. 2 is a circuit view of a device to protect a semiconductor device from electrostatic discharge according to Korean Patent Application No. 2004-0114210.

In order to solve the problems associated with the conventional art, the applicants of the present invention have filed for a device to protect a semiconductor device from electrostatic discharge as "Korean Patent Application No. 2004-0114210", seen in FIG. 2.

Referring to FIG. 2, a transfer unit 21 and a discharge unit 24 of a semiconductor electrostatic discharge protection device are structured in the same manner as the transfer unit 11 and the discharge unit 14 of FIG. 1.

However, a detection unit 22 includes a resistance element R2 and a diode D1 coupled in series between an input/output terminal 25 and a power voltage line VCC and detects a voltage drop according to the electrostatic current flowing in the power voltage line VCC. Additionally, a driving unit 23 is coupled between an output terminal of the detection unit 22 and a ground voltage line VSS to amplify the electrostatic current flowing in the power voltage line VCC and to drive the detection unit 24 so that the power voltage line VCC and the ground voltage line VSS are intercoupled to discharge the static electricity inputted to the power voltage line VCC to the ground voltage line VSS.

As described above, in the semiconductor electrostatic discharge protection device of FIG. 2, the detection unit 22 continuously detects a voltage drop during the interval where the static electricity flowing in the power voltage line VCC is larger than a predetermined magnitude so that the operating time of the semiconductor electrostatic discharge protection device increases. However, since the detection unit 22 detects a voltage drop when the operating voltage of the diode D1 is applied, i.e., voltage of about 0.7V or more, a latter half operation part where the electrostatic current becomes small, is not sufficient to prevent damage to an internal circuit 26. Accordingly, an embodiment of the present invention solves these shortcomings of the above mentioned semiconductor electrostatic discharge protection device as in FIG. 2.

Figure 3:
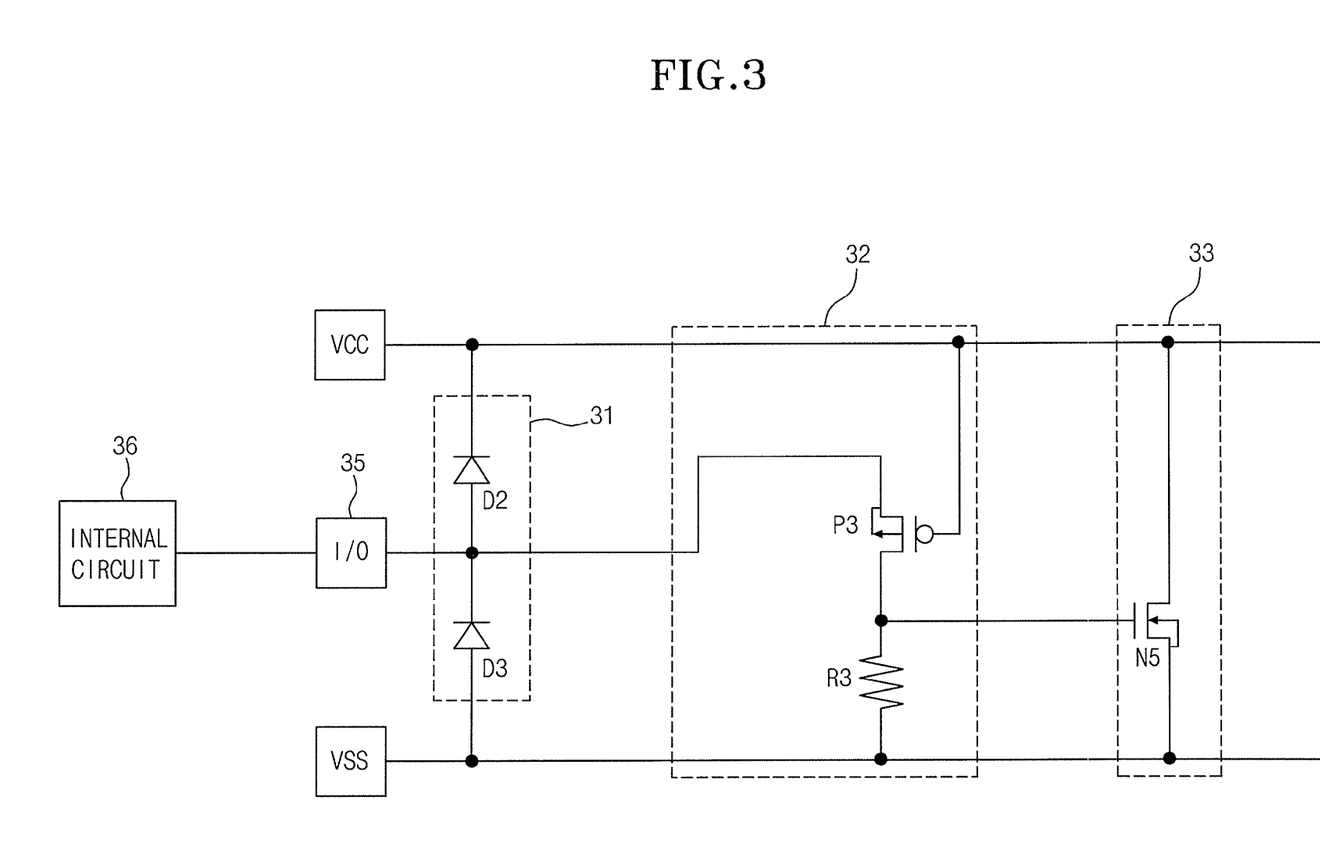
FIG. 3 is a circuit view of a device to protect a semiconductor device from electrostatic discharge according to a first embodiment of the present invention.

Referring to FIG. 3, a device to protect a semiconductor device from electrostatic discharge according to a first embodiment of the present invention includes a transfer unit 31, a driving unit 32, and a discharge unit 33.

The transfer unit 31 is comprised of diodes D2 and D3 coupled in series between a power voltage line VCC and a ground voltage line VSS. Herein, a cathode of the diode D2 is coupled to the power voltage line VCC, an anode of diode D2 is coupled to an input/output terminal 35, and a cathode of the diode D3 is coupled to the input/output terminal 35 and an anode of diode D3 is coupled to the ground voltage line VSS.

The driving unit 32 is comprised of a PMOS transistor P3 and a resistance element R3 coupled in series between the input/output terminal 35 and the ground voltage line VSS.

Herein, a gate of the PMOS transistor P3 is coupled to the power voltage line VCC, a source of PMOS transistor P3 is coupled to the input/output terminal 35, and a drain of PMOS transistor P3 is coupled to one end of the resistance element R3. The other end of the resistance element R3 is coupled to the ground voltage line VSS.

The discharge unit 33 is comprised of a NMOS transistor N5 of which the drain is coupled to the power voltage line VCC, the source is coupled to the ground voltage line VSS, and gate is supplied with an output of the driving unit 32. As shown in FIG. 3, the output of the driving unit 32 is supplied from the node where the drain of the PMOS transistor P3 and the resistance element R3 are coupled.

The operation of the device to protect the semiconductor device from electrostatic discharge according to the first embodiment of the present invention will be described having the configuration as described above.

If static electricity is inputted to the input/output terminal 35, the transfer unit 31 discharges or transfers the static electricity to the power voltage line VCC or the ground voltage line VSS. The driving unit 32 is driven due to a voltage drop by parasitic resistance existing in the transfer unit 31. The discharge unit 33 is operated by the output of the driving unit 32 to discharge the static electricity to the power voltage line VCC or the ground voltage line VSS.

For example, since the voltage drop is generated by way of the parasitic resistance of the diode D2 when the static electricity inputted to the input/output terminal 35 is discharged or transferred to the power voltage line VCC, the PMOS transistor P3 is turned on due to a voltage difference between the power voltage line VCC and the input/output terminal 35 so that a gate voltage of the NMOS transistor N5 increases. If the gate voltage reaches a turn-on voltage, the NMOS transistor N5 operates to couple the power voltage line VCC to the ground voltage line VSS so that the static electricity inputted to the power voltage line VCC is discharged to the ground voltage line VSS.

As described above, compared to the semiconductor electrostatic discharge protection device shown in FIG. 2, the device to protect the semiconductor device from electrostatic discharge according to the first embodiment of the present invention uses a voltage loss in the operation voltage of diode D1 of the detection unit as seen in FIG. 2 as the driving voltage so that it may perform a sufficient discharge operation in the latter half part when the electrostatic current becomes small.

Figure 4:
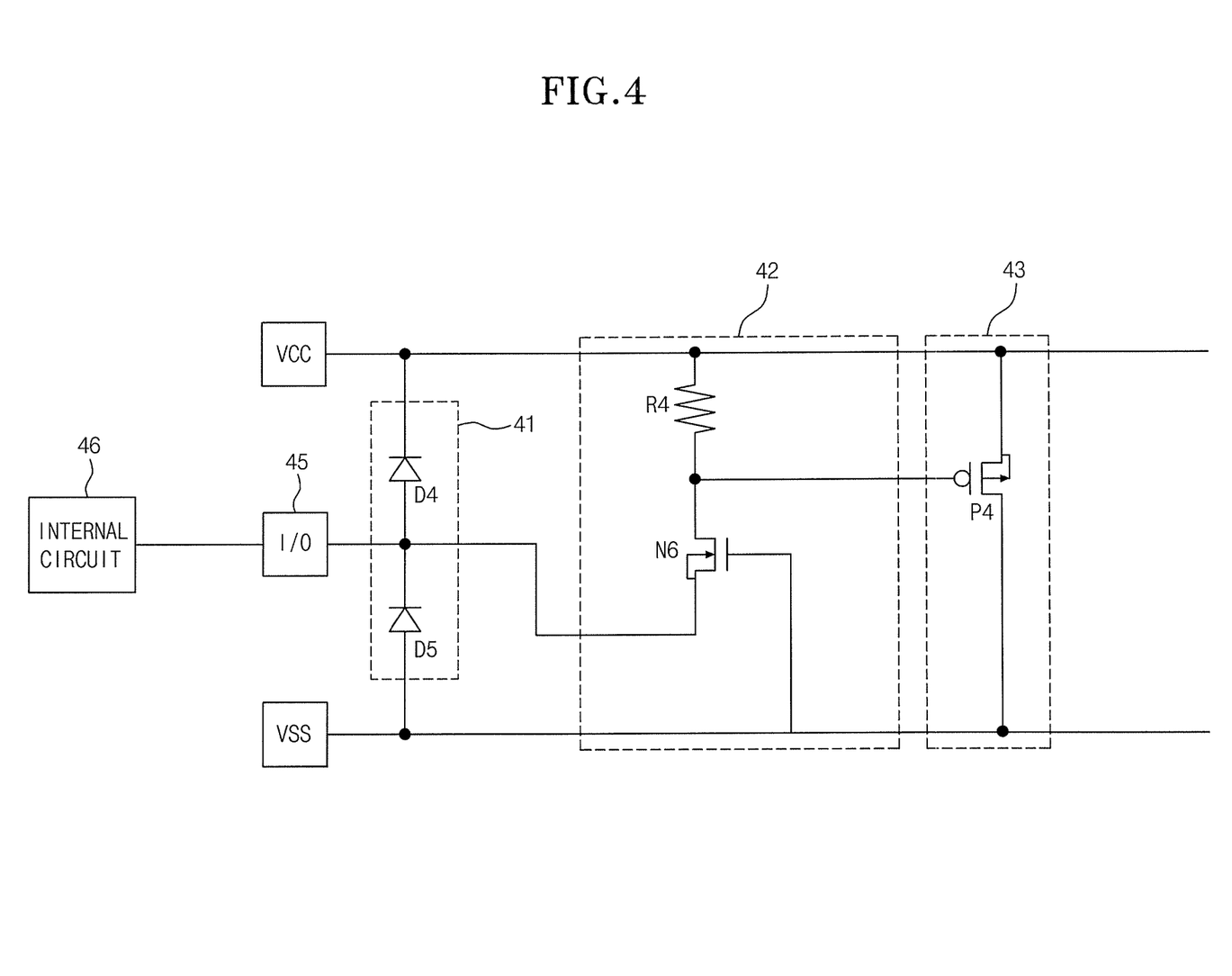
FIG. 4 is a circuit view of a device to protect a semiconductor device from electrostatic discharge according to a second embodiment of the present invention.

Referring to FIG. 4, a device to protect a semiconductor device from electrostatic discharge according to a second embodiment of the present invention has a transfer unit 41, a driving unit 42, and a discharge unit 43.

The transfer unit 41 is the same as the transfer unit 31 described according to the first embodiment of the present invention (See FIG. 3). However, the driving means 42 is comprised of a NMOS transistor N6 and a resistance element R4 coupled in series between an input/output terminal 45 and a power voltage line VCC. The discharge unit 43 has a PMOS transistor P4. Herein, a gate of the NMOS transistor N6 is coupled to a ground voltage line VSS, a source of NMOS transistor N6 is coupled to the input/output terminal 45, and a drain of NMOS transistor N6 is coupled to the resistance element R4.

The operation of the device to protect the semiconductor device from electrostatic discharge according to the second embodiment of the present invention will be described having the configuration as described above.

For example, since the voltage drop is generated by way of the parasitic resistance of a diode D5 when negative static electricity inputted to the input/output terminal 45 is discharged or transferred to the ground voltage line VSS, the NMOS transistor N6 is turned on due to a voltage difference between the ground voltage line VSS and the input/output terminal 45 so that a gate voltage of the PMOS transistor P4 drops. If the gate voltage reaches a turn-on voltage, the PMOS transistor P4 operates to couple the power voltage line VCC to the ground voltage line VSS so that the static electricity inputted to the ground voltage line VSS is discharged to the power voltage line VCC.

As described above, the device to protect the semiconductor device from electrostatic discharge according to the second embodiment of the present invention performs a sufficient discharge operation in the latter half part when the electrostatic current becomes small in the same manner as the first embodiment and is suitable for protecting an internal circuit 46 from the negative static electricity inputted to the input/output terminal 45 when elements that are coupled to the power voltage line VCC are very weak.

Figure 5:
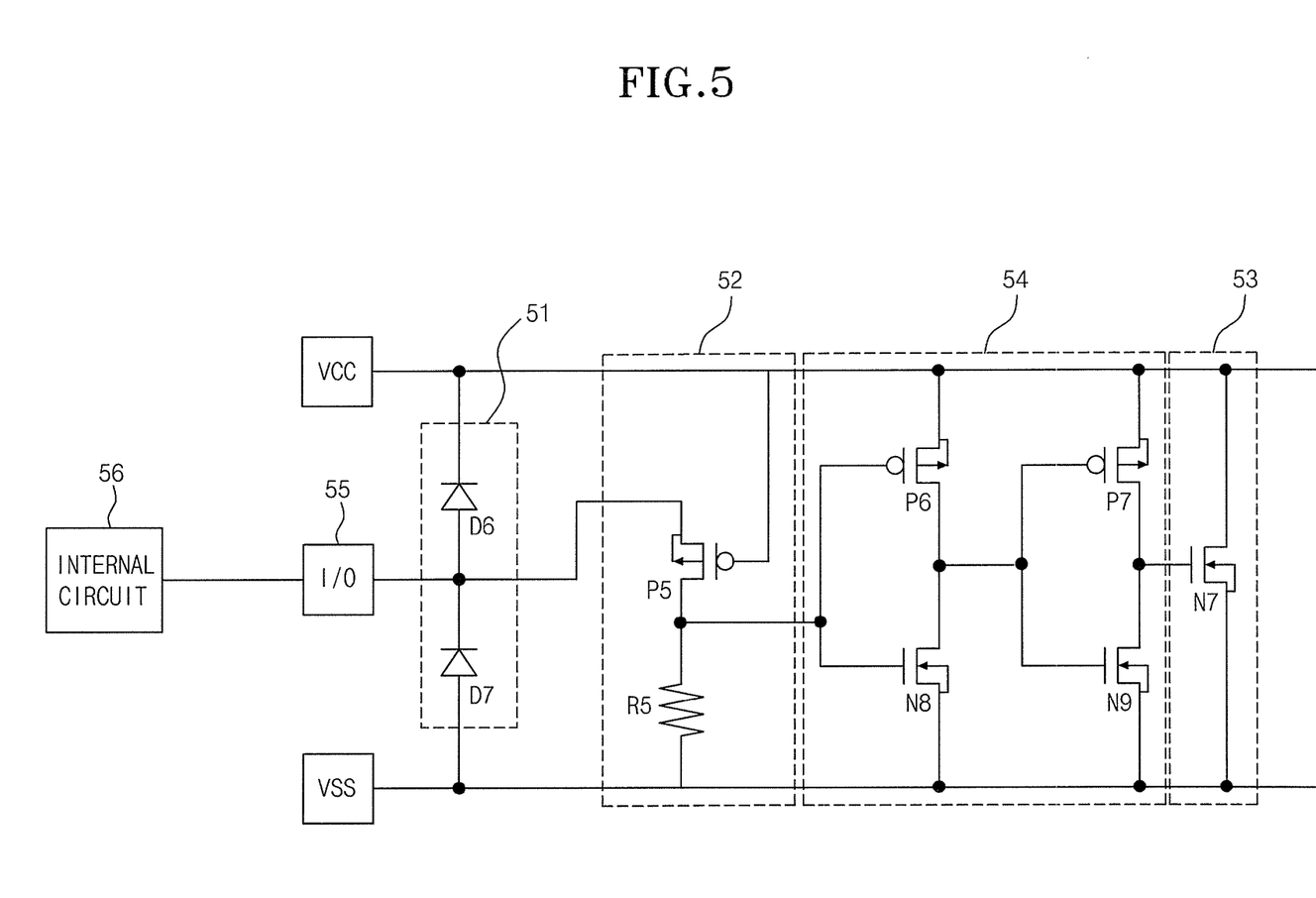
FIG. 5 is a circuit view of a device to protect a semiconductor device from electrostatic discharge according to a third embodiment of the present invention.

Referring to FIG. 5, a device to protect a semiconductor device from electrostatic discharge according to a third embodiment of the present invention comprises a transfer unit 51, a driving unit 52, and a discharge unit 53 and are the same as the transfer unit 31, the driving unit 32, and the discharge unit 33 according to the first embodiment (see FIG. 3) of the present invention in structure and operation.

However, in the third embodiment of the present invention, an amplifying unit 54 is further provided, located prior to the discharge unit 53 to amplify and output the received output of the driving unit 52.

The amplifying unit 54 includes an even-numbered of inverters coupled in parallel between a power voltage line VCC and a ground voltage line VSS. The inverters, shown in FIG. 5, are comprised of PMOS transistors P6 and P7 and NMOS transistors N8 and N9 coupled in series between the power voltage line VCC and the ground voltage line VSS having their respective gates coupled in common.

As described above, the device to protect the semiconductor device from electrostatic discharge according to the third embodiment of the present invention amplifies signals outputted from the driving unit 52 by the amplifying unit 54 and applies them to the discharge unit 53, thereby making it possible to more rapidly and more safely perform the discharge operation.

Figure 6:
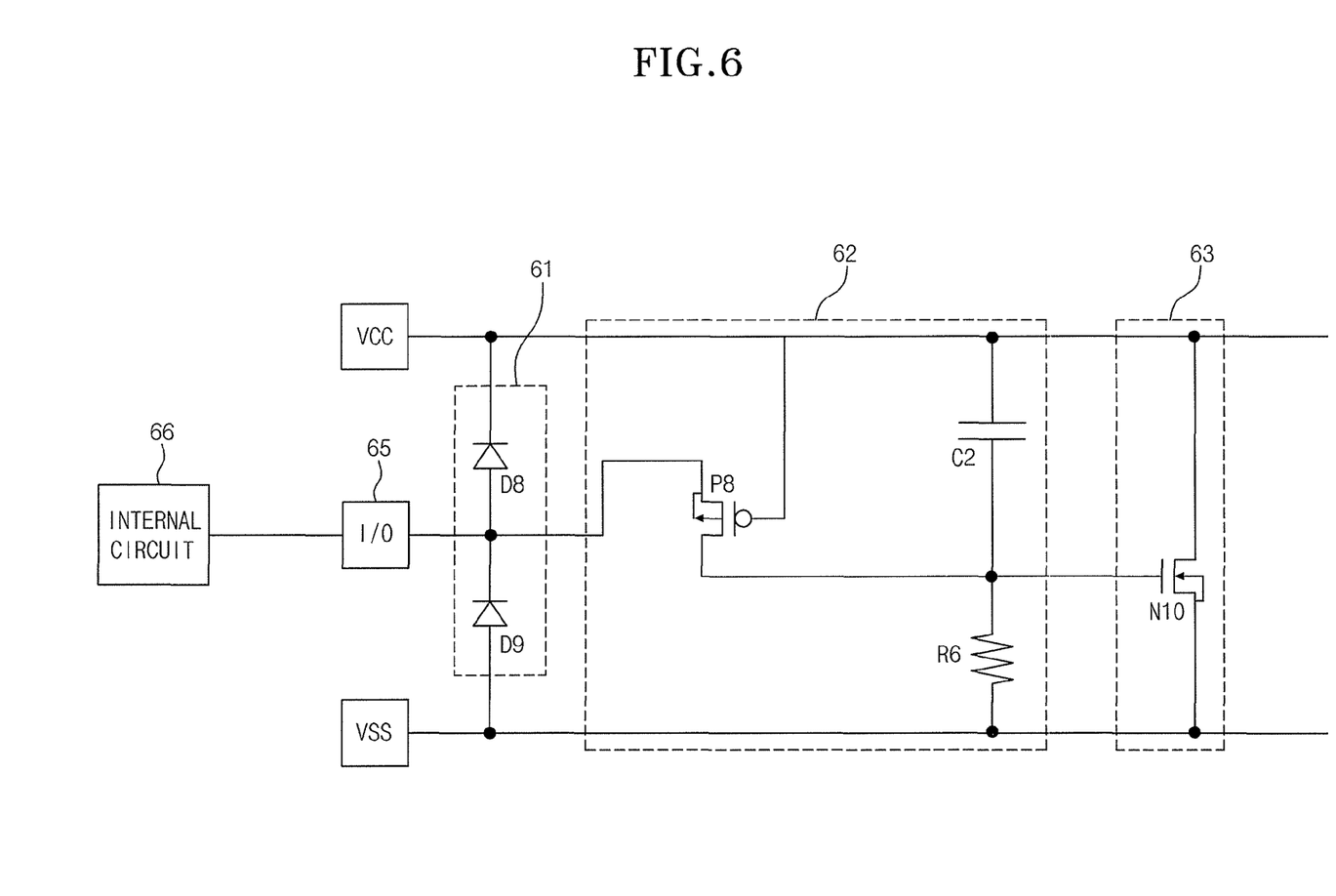
FIG. 6 is a circuit view of a device to protect a semiconductor device from electrostatic discharge according to a fourth embodiment of the present invention.

Referring to FIG. 6, a device to protect a semiconductor device from electrostatic discharge according to a fourth embodiment of the present invention comprises a transfer unit 61, a driving unit 62, and a discharge unit 63. Herein, the transfer unit 61 and the discharge unit 63 are the same as the transfer unit 31 and the discharge unit 33 according to the first embodiment (see FIG. 3) of the present invention in structure and operation.

However, the driving unit 62 is comprised of a PMOS transistor P8 and a resistance element R6 coupled in series between an input/output terminal 65 and a ground voltage line VSS and further includes a capacitor C2 coupled between an output terminal of the PMOS transistor P8 and a power voltage line VCC. Herein, a gate of the PMOS transistor P8 is coupled to the power voltage line VCC, a source of PMOS transistor P8 is coupled to an input/output terminal 35, and a drain of PMOS transistor P8 is coupled to the resistance element R6.

The device to protect the semiconductor device from electrostatic discharge according to the fourth embodiment of the present invention as described above, applies output signals to the discharge unit 63 through the capacitor C2 of the driving unit corresponding to an early alternating current of static electricity. Further, the PMOS transistor P8 is driven according to a voltage difference between the input/output terminal 65 and the power voltage line VCC and applies the output signals to the discharge unit 63 more rapidly to drive the discharge unit 63 to protect an internal circuit 66.

Figure 7:
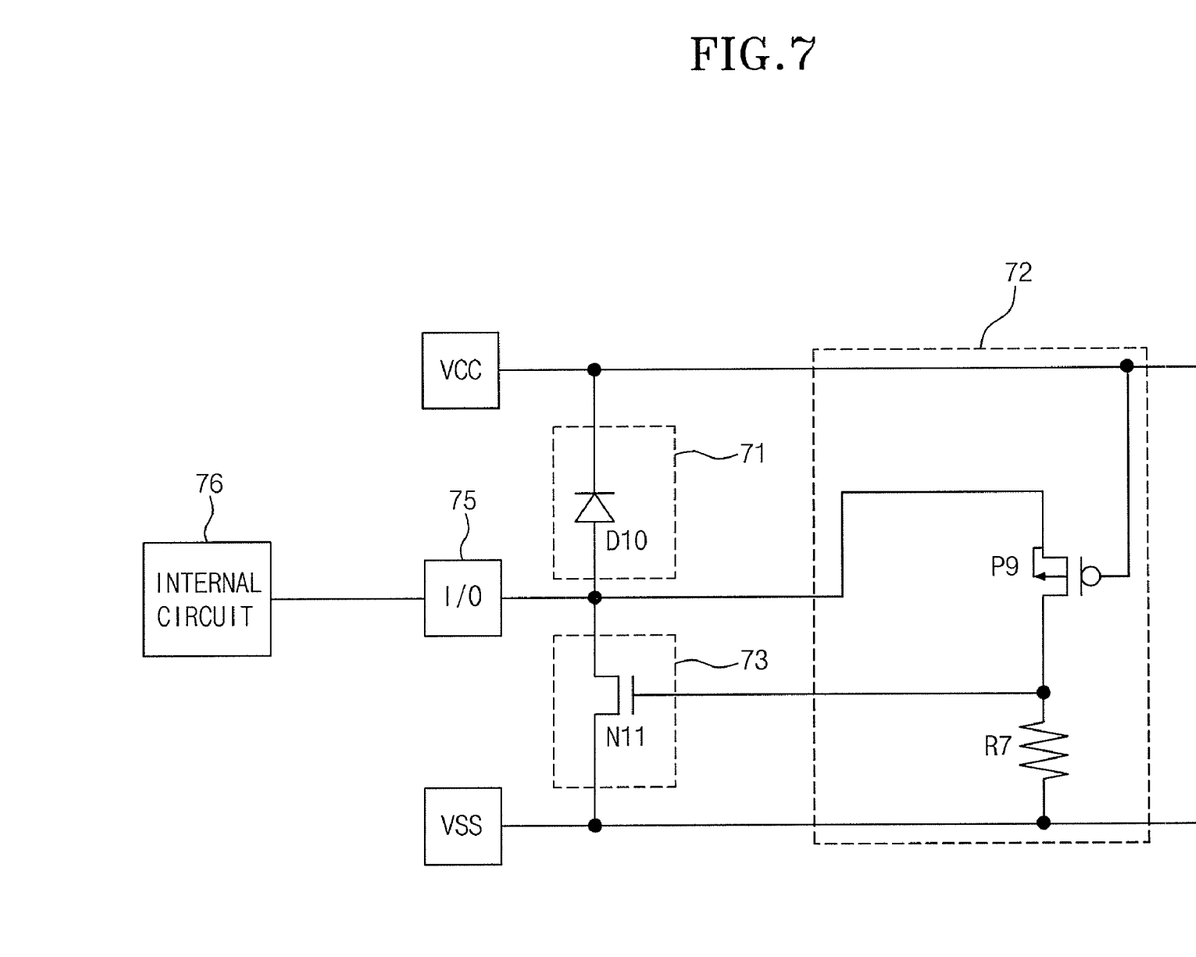
FIG. 7 is a circuit view of a device to protect a semiconductor device from electrostatic discharge according to a fifth embodiment of the present invention.

Referring to FIG. 7, a device to protect a semiconductor device from electrostatic discharge according to a fifth embodiment of the present invention is comprised of a transfer unit 71, a driving unit 72, and a discharge unit 73.

The transfer unit 71 is comprised of a diode D10 coupled between an input/output terminal 75 and a power voltage line VCC. Herein, a cathode of the diode D10 is coupled to the power voltage line VCC and an anode of diode D10 is coupled to the input/output terminal 75.

The driving unit 72 is comprised of a PMOS transistor P9 and a resistance element R7 coupled in series between the input/output terminal 75 and a ground voltage line VSS. Herein, a gate of the PMOS transistor P9 is coupled to the power voltage line VCC, a source of PMOS transistor P9 is coupled to the input/output terminal 75, and a drain of PMOS transistor P9 is coupled to the resistance element R7.

The discharge unit 73 is comprised of a NMOS transistor N11 of which the source is coupled to the ground voltage line VSS, the drain is coupled to the input/output terminal 75, and gate is supplied with an output from the driving unit 72. As shown in FIG. 7, the output of the driving unit 72 is supplied from the node where the drain of PMOS transistor P9 and resistance element R7 are coupled.

The operation of the device to protect the semiconductor device from electrostatic discharge according to the fifth embodiment of the present invention will be described having the configuration described above.

The transfer unit 71 discharges or transfers static electricity inputted to the input/output terminal 75 to the power voltage line VCC through the diode D10. At this time, a voltage drop is generated having a magnitude equal to an operating voltage (0.7V) of the diode D10 plus the product of the parasitic resistance of the diode D10 and the magnitude of the electrostatic current (I*R: where I represents electrostatic current and R represents parasitic resistance).

The driving unit 72 is turned on by the application of the voltage drop of the diode D10 to the gate of the PMOS transistor P9 to output the voltage drop of the resistance element R7.

When a gate voltage of the NMOS transistor N11 reaches a turn-on voltage by being supplied with the output of the driving unit 72 to the gate of the NMOS transistor N11, the discharge unit 73 operates to couple the input/output terminal 75 to the ground voltage line VSS so that the static electricity is discharged to the ground voltage line VSS.

Figure 8:
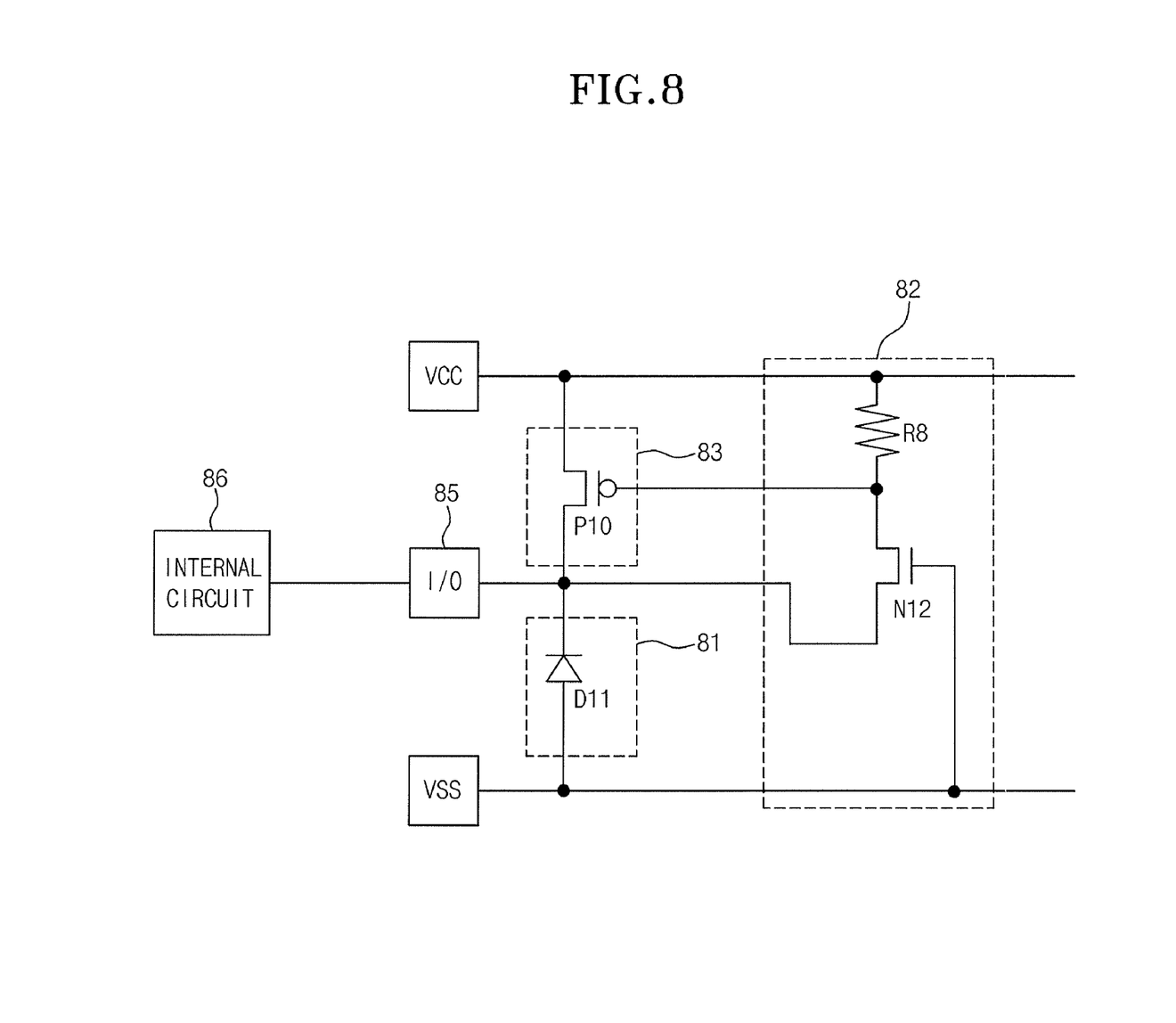
FIG. 8 is a circuit view of a device to protect a semiconductor device from electrostatic discharge according to a sixth embodiment of the present invention.

Referring to FIG. 8, a device to protect a semiconductor device from electrostatic discharge according to a sixth embodiment of the present invention is comprised of a transfer unit 81, a driving unit 82, and a discharge unit 83.

The transfer unit 81 is comprised of a diode D11 coupled between an input/output terminal 85 and a ground voltage line VSS. Herein, a cathode of the diode D11 is coupled to an input/output terminal 85 and an anode thereof is coupled to the ground voltage line VSS.

The driving unit 82 is comprised of a NMOS transistor P12 and a resistance element R8 coupled in series between the input/output terminal 85 and the power voltage line VCC. Herein, a gate of the NMOS transistor N12 is coupled to a ground voltage line VSS, a source of NMOS transistor N12 is coupled to the input/output terminal 75, and a drain of NMOS transistor N12 is coupled to the resistance element R8.

The discharge unit 83 is comprised of a PMOS transistor P10 of which the drain is coupled to the input/output terminal 85, the source is coupled to the power voltage line VCC, and the gate is supplied with an output of the driving unit 83. As shown in FIG. 8, the output of the driving unit 82 is supplied from the node where the drain of the NMOS transistor N12 and resistance element R8 are coupled.

The operation of the device to protect the semiconductor device from electrostatic discharge according to the sixth embodiment of the present invention will be described having the configuration described above.

The transfer unit 81 discharges and transfers static electricity inputted to the input/output terminal 85 to the ground voltage line VSS through the diode D11. At this time, a voltage drop is generated having a magnitude equal to an operating voltage (0.7V) of the diode D11 plus the product of the parasitic resistance of the diode D11 and the magnitude of electrostatic current.

The driving unit 82 is turned on by application of the voltage drop of the diode D11 to the gate of the NMOS transistor N12 to output the voltage drop of the resistance element R8.

When a gate voltage of the PMOS transistor P10 reaches a turn-on voltage by being supplied with the output of the driving unit 82 to the gate of the PMOS transistor N10, the discharge unit 83 operates to couple the input/output terminal 85 to the power voltage line VCC so that the static electricity is discharged to the power voltage line VCC.

As described above, in contrast to first through fourth embodiments of the present invention, the device to protect the semiconductor device from electrostatic discharge according to the fifth and sixth embodiments promptly discharges the electrostatic current inputted to the input/output terminal to the corresponding power line to reduce a voltage drop by an intermediate medium and thereby safely protecting an internal circuit. Whereas the first through fourth embodiments of the present invention differ in that they have a risk of damaging a gate insulating film or a junction part of an internal element due to a voltage drop of an intermediate medium by discharging the electrostatic current inputted to the input/output terminal to another power line through the transfer unit and any one of power lines.

Therefore, according to the present invention, there is provided a device to protect a semiconductor device from electrostatic discharge using an operating voltage to drive a driving unit that drives a discharge unit, making it possible to safely protect an internal circuit by sufficiently discharging a micro current in a latter half part of static electricity.

Also, according to the present invention, there is provided a device to protect a semiconductor device from electrostatic discharge reducing an intermediate medium on a discharge path of static electricity, making it possible to prevent damage to an internal circuit due to the voltage drop of an intermediate medium.

Those skilled in the art will appreciate that the specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth in the appended claims.

What is claimed is:

1. A device to protect a semiconductor device from electrostatic discharge, including:
    a transfer means transferring static electricity input to an input/output terminal to a first power line;
    a driving means outputting a driving voltage corresponding to a potential difference between the input/output terminal and the first power line; and
    a discharge means discharging the static electricity input to the input/output terminal by means of the driving voltage to a second power line,
    wherein the driving means includes a NMOS transistor and a resistor connected in series between the input/output terminal and the second power line, and the NMOS transistor has a source directly connected to the input/output terminal, a drain connected to one terminal of the resistor, and a gate connected to the first power line.

2. The device to protect the semiconductor device from electrostatic discharge as set forth in claim 1, wherein the first power line is a ground voltage line and the second power line is a power voltage line.

3. The device to protect the semiconductor device from electrostatic discharge as set forth in claim 2, wherein the transfer means is constituted by including a forward diode.

4. The device to protect the semiconductor device from electrostatic discharge as set forth in claim 3, wherein the discharge means has a transistor switched by means of the driving voltage.

5. The device to protect the semiconductor device from electrostatic discharge as set forth in claim 1, further comprising an amplifying means amplifying the driving voltage, wherein the amplifying means includes even numbers of inverters connected in parallel between the first and second power lines.

6. The device to protect the semiconductor device from electrostatic discharge as set forth in claim 1, wherein the resistor is a static resistor.

7. A device to protect a semiconductor device from electrostatic discharge, including:
    a transfer means transferring static electricity input to an input/output terminal to a first power line;
    a driving means outputting a driving voltage corresponding to a potential difference between the input/output terminal and the first power line; and
    a discharge means discharging the static electricity input to the input/output terminal by means of the driving voltage to a second power line,
    wherein the driving means includes a PMOS transistor and a resistor connected in series between the input/output terminal and the second power line and a capacitor connected between an output terminal of the PMOS transistor and the first power line, and the PMOS transistor has a gate connected to the first power line, a source connected to the input/output terminal, and a drain connected to the resistor.

8. A device to protect a semiconductor device from electrostatic discharge, including:
    a transfer means transferring static electricity input to an input/output terminal to a first power line;
    a driving means outputting a driving voltage corresponding to a potential difference between the input/output terminal and the first power line;
    a discharge means including a PMOS transistor having a drain connected to the input/output terminal, a source connected to a second power line, and a gate applied with the driving voltage,
    wherein the driving means includes a NMOS transistor and a resistor connected in series between the input/output terminal and the second power line, and the NMOS transistor has a gate connected to the first power line, a source to the input/output terminal, and a drain connected to the resistor.

* * * * *